Sept. 28, 1965
E. L. WISOR
3,208,184
TURKEY CALLER
Filed April 16, 1963
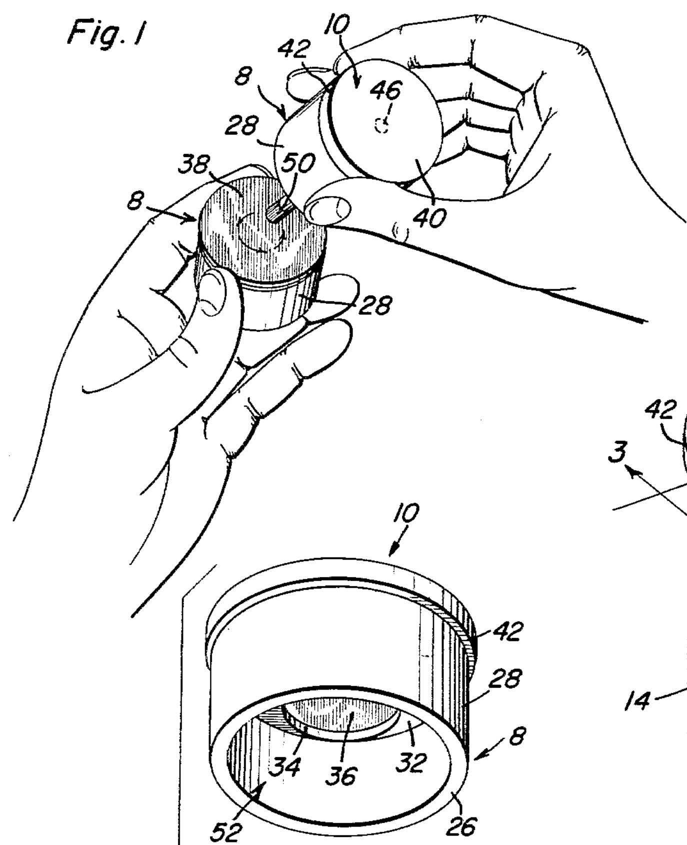
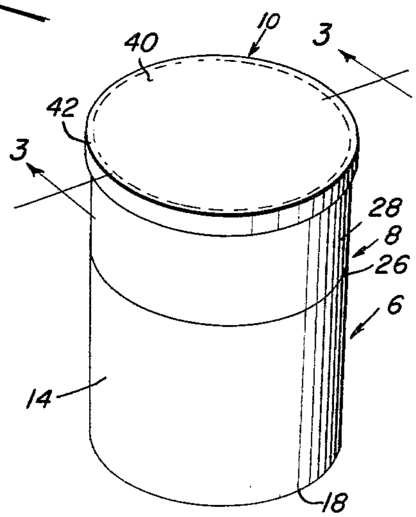
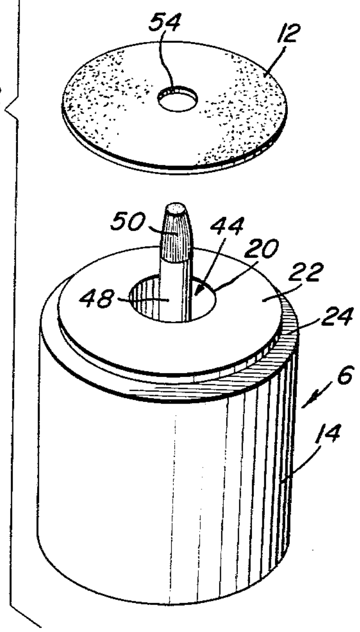
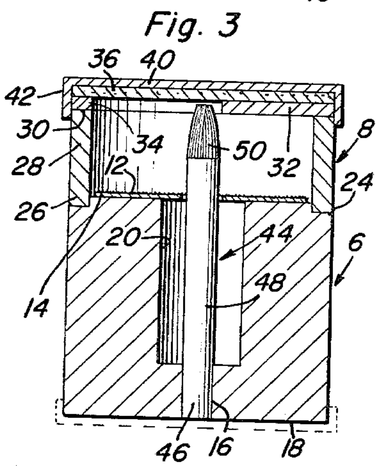
Edward L. Wisor
INVENTOR.
BY Clarence A. O'Brien and Harvey B. Jacobson
Attorneys United States Patent Office 3,208,184 Patented Sept. 28, 1965

1

3,208,184

TURKEY CALLER

Edward L. Wisor, R.D. 1, Box 1262, Clarendon, Pa.

Filed Apr. 16, 1963, Ser. No. 273,389
5 Claims. (Cl. 46—189)

The present invention relates to an improved turkey caller which is unique in that the component parts embodied therin cooperate in perfecting a structural adaptation which, when compared to analogous prior art callers, better serves the purposes for which turkey callers are intended.

It is old in this art to employ hand-held companion units which when deftly handled and skillfully utilized function to generate and emit controllable sounds which can be utilized as animal and bird calls. Because it has a bearing on the subject matter of the instant proceeding reference may be made to Tannehill's bird call revealed in U.S. Patent No. 2,958,157 characterized by two hand-held units wherein one embodies a slate anvil and the other one embodies a friction-responsive vibrator which when the tip or terminal end thereof is friction-rubbed on the slate's surface produces a controllable sound which perhaps could imitate the yelp of a turkey. It follows that it is an object of the instant concept to structurally, functionally and in other ways improve upon the Tannehill patent and any analogous prior art calls which may be regarded as competitive adaptations.

In carrying out the present invention a caller for turkeys has been evolved, produced and repeatedly and successfully used, said caller being characterized, broadly speaking by two parts, namely, a sound-generating unit or member having a vibratory striker post or peg and which is held in the right hand of the user, and a companion part which embodies a hollow sound reinforcing and intensifying chamber or cup and which is provided with a slate or an equivalent anvil-like friction surface upon and against which a cooperating free end of the sound generating peg is forcibly and frictionally rubbed to perfect the yelping sound desired.

In carrying out the preferred embodiment of the invention the structure employed functions to provide an instrumentality which is compact and easy to carry, is attractive in shape and design, permits gripping and holding of the companion parts in a manner which makes their use easy and practical and is desirable in that these principal parts can be manufactured on a drill press or a wood lathe, the needed material being minimal and the cost of production and handling in the low price range in keeping with the desires of manufacturers, retailers and hunters or other users.

Also and as will be hereinafter better appreciated the design and shape, being cylindrical, not only offers eye attraction appeal but is a practical innovation in that the two principal parts may be fitted together in end-to-end relationship whereby to thus provide an entity which can be easily carried, when not in use, in the user's pocket.

Both of the principal parts have cooperating ends fitted together in a telescoping manner, the parts being readily connectible and separable for ready use and the particular construction of the parts being such that even though the free end or tip of the vibratory peg or post projects beyond the corresponding end of the part carrying it, it is nevertheless safeguarded and protected because of the fact that it projects into the hollow portion of the other part, the latter part for this, and other purposes, having the form of and providing a sound-reinforcing and resonating cup. Then, too, the very fact that the cup conceals and protects the vibration generating peg, the latter is kept dry and in readiness for use when necessary or desired.

Briefly summarized the improved caller comprises an amply deep sound trapping and reinforcing cup or chamber which is open at one end and is closed at the other end, the last-named end having the aforementioned friction slate or anvil embodied therein and there being an apertured diaphragm paralleling and in contact with the slate and having the aperture communicable with the receptacle portion of the cup. The second part comprises a hand-grippable body which is generally circular or cylindrical in cross-section and has an axial wooden or an equivalent vibratory peg with one end thereof adjustably fitted in the hole provided therefor and with the major portion of the peg extending through an axial recess which opens through one end of the body and which not only provides clearance for the vibration responsive peg but provides a sound or tone resonating well around the peg.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing the two principal hand-held parts; namely, the slate-equipped sound reinforcing cup or box (normally the top unit) in the left hand and the sound generating or peg-equipped unit (normally the bottom part) in the other hand, the two units or parts being disposed in ready-to-function relationship;

FIGURE 2 is a view, drawn on a larger scale, of the turkey caller by itself and wherein a slate-protecting cap or cover is shown in use;

FIGURE 3 is a section taken approximately on the plane of the line 3—3 of FIGURE 2 with the vibratory peg or post appearing in elevation and also showing, in phantom lines, the manner in which the cover can be shifted from the top to the bottom of the caller; and FIGURE 4 is an exploded perspective view showing all of the featured parts, that is, the two principal parts, the removble cap on one of said parts and the abrasive or sandpaper collar between the parts.

The two principal units or parts are denoted by the numerals 6 and 8, respectively. A third part, a simple applicable and removable cap or cover is denoted at 10. An optionally usable slate roughening abrasive collar is denoted at 12.

The part 6 comprises a one-piece (preferably) body 14 which may be of wood or other suitable material, this body being circular or cylindrical in cross-section, having a restricted axial bore 16 extending through the bottom side 18 and communicating at its top with a counterbored recess 20 which opens through the upper end or side. The upper end as shown in FIG. 4 is reduced in cross-section to define an elevated annular surface 22 encircled by a ledge 24. This simple stepped construction serves a purpose which is evident particularly in FIG. 3 in that it functions to accommodate the lower lip portion 26 of the sleeve-like body or rim 28 of the separable and attachable part or unit 8. This unit has its upper end 30 level and serving to firmly seat and support a suitably attached circular disk or diaphragm 32 having an off-center hole or aperture 34 therein. This diaphragm supports a suitably attached disk-like slate 36 whose exterior surface 38 (FIG. 1) is exposed for use in the manner illustrated in FIG. 1. The slate when not in use is protected by the attachable and removable cover or cap 40 which latter is provided with a suitable rim 42 which conformably fits the parts with which it is associated and frictionally retained in the manner shown. This cap incidentally is convertible and shiftable from the full line position to the dotted line position as shown in FIG. 3.

A highly important expedient is the sound generating or vibratory element 44. This comprises a readily insertable and removable wooden peg or post having a lower end portion 46 friction fitted but slidingly adjustable in a socket or bore 16 provided therefor in the manner illustrated. This peg has its major portion 48 extending through the clearance pocket or recess 20 and has its upper blunt pointed end 50 extending above the upper end 22 and into the receptacle portion or sound chamber 52 of the aforementioned cup unit or part 8. The numeral 12 as already pointed out comprises a simple optionally usable abrasive collar having an opening 54 at the center which is fitted over the projecting end of the peg. The projecting end of the peg in practice is sparingly burned or charred to cooperate in a highly satisfactory manner with the surface of the slate 38 in the circulatory rubbing manner illustrated in FIG. 1.

It will be evident from FIGS. 2 and 3 that the main cooperating parts 6 and 8 are telescopically fitted together in axial alignment when the device is not being used. Consequently, the part 8 then functions as a cover or closure and protects the charred projecting end of the post 44 and also the abrasive ring or collar 12. The latter is used for roughening the surface 38 which, as practice has shown, is desirable in order to achieve the best obtainable results. As already suggested, the cover or cap 40 provides protection for the surface of the slate 36 in the manner illustrated in FIGS. 2, 3 and 4. When the device is in use the cover 40 can be detached from the part 8 and then applied to the bottom of the part 6 as shown in phantom lines in FIG. 3.

It should be noted that the bore 16 extends all the way through the bottom 18 and that the portion 46 of the peg which is anchored therein is capable of being pushed through this bore all the way or partly so in order to thus shorten the free vibratory portion 48 of the peg. Experience has shown that this highly significant adjustable peg anchoring feature 16 and 46 has much to do with perfection of the quality of tone which is necessary to imitate a good and convincing turkey yelp. Then, too, when the peg 44 wears and gets too short it can be replaced by a fresh one. Experience has shown that the end portion 50 has to be repeatedly burned and charred, but sparingly, in order to obtain best desirable results as suggested in FIG. 1. However, this burning away shortens the life of the peg and for this reason having a renewable peg is a significant and prominent feature of the concept.

With the open bottom of the cup facing toward the palm or side of the left hand as the part 8 is held in the left hand in FIG. 1, it will be evident that by cupping the hand more or less this manner of holding and using the sound chamber or cup is in and of itself novel. Practice has also shown that with the device held in the cupped hand and with the cupped side of the hand brought in close to the user's body, say at the waist area, the desired total effect can be rounded out and, in fact, many and varied effects can be had.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A turkey caller comprising a first part adapted to be held in one hand of the user, said first part comprising a body which is cylindrical in cross-section, has its upper end reduced to define a marginally encompassing ledge, which has its axial portion bored and then axially counterbored, the counterbore being restricted in cross-section and extending from the bottom of the bore through the bottom of the body and providing a socket, the major portion of said bore constituting a clearance space, an insertable and removable vibratory peg having a lower end portion adjustably and removably friction fitted in said socket and its major portion extending upwardly through and beyond said bore and above the top of said body portion, and a complemental part for use in association with and physically attached to said first-named part and adapted to be held in the user's other hand and being hollow and providing a sound wave amplifying chamber and being further provided with a built-in slate, said slate constituting an anvil with which the free tip end of said peg can be cooperatively coordinated when being used.

2. A caller of the class described comprising a two-part device, one of said parts embodying a body designed and adapted to be held in and operated by one hand of the user, said body being provided with a vibratory sound generating member, the other part likewise designed and adapted to be held and used at will in the user's other hand and embodying a hollow sound reinforcing and intensifying chamber and provided with a cooperating planar anvil-like friction surface upon and against which an end of said sound generating member is forcibly and frictionally rubbed in a manner to perfect the sound desired, said parts being axially aligned and separably and telescopically joined together in alignment, each of said parts being circular in cross-section, the cross-sectional dimension of said parts being approximately the same, said sound generating member comprising a peg-like dowel pin having one end adjustably anchored in said body and the other end free and blunt-pointed for free and easy wiping, whirling and frictional contact with said friction surface.

3. A caller of the class described, comprising in combination, a first part adapted to be held, for example, with the fingers of the right hand, said part comprising an elongated generally solid body, said body being circular in cross-section and provided with an axial elongated recess communicating at its bottom with a reduced bore, said bore extending through the bottom of said body and providing a socket, a renewable bodily applicable and removable axially disposed vibratory peg having its major portion extending down through said recess and having its lower end adjustably and removably mounted in said socket, the upper end projecting beyond the corresponding upper end of the body, and a second part embodying an open-bottom cup-like body portion detachably connected with the upper end of the first-named body portion and closed and provided at its top with an anvil-like slate with which the free end of said peg is operatively engageable and cooperable, the hollow part of said cup-like body portion constituting and providing a sound amplifying chamber.

4. A caller of the class described, in combination, a first part adapted to be held, for example, with the fingers of the right hand, said part comprising an elongated generally solid body, said body being circular in cross-section and provided with an axial elongated recess communicating at its bottom with a reduced bore, said bore extending through the bottom of said body and providing a socket, a renewable bodily applicable and removable axially disposed vibratory peg having its major portion extending down through said recess and having its lower end adjustably and removably mounted in said socket, the upper end projecting beyond the corresponding upper end of the body, and a second part structurally and functionally complemental to said first part, said second part comprising a hollow cup also circular in crass-section and having the same cross-sectional dimension as the body of said first part, said cup being closed and provided at its top with a fixed anvil-like noisemaking slate, said cup having an open bottom and being axially aligned with and separably joined to the upper end of said body, the hollow portion of said cup providing (1) a sound trapping and amplifying chamber and (2) an enclosing and protecting chamber for the upper projecting end of said peg when the two parts are fitted together, that is, when not being used.

5. The caller defined in claim 4, and in combination, a readily applicable and removable cap, said cap providing a cover for said slate and being (1) attachable to the closed end of said cup when functioning as said cover and being (2) removably attachable to the bottom of said first part when it, said cover, is temporarily stored in an out-of-use positon.

References Cited by the Examiner

UNITED STATES PATENTS

| | | | |
|---|---|---|---|
| 2,121,221 | 6/38 | Fontan | 206—56 X |
| 2,643,483 | 6/53 | Walker | 46—189 |
| 2,720,054 | 10/55 | Grazier | 46—189 |
| 2,958,157 | 11/60 | Tannehill | 46—177 |

DELBERT B. LOWE, *Primary Examiner.*

RICHARD C. PINKHAM, *Examiner.*